March 11, 1930.  C. C. FUERST  1,750,222
CAMERA LENS CARRIAGE AND TRACK LATCH
Filed June 29, 1928
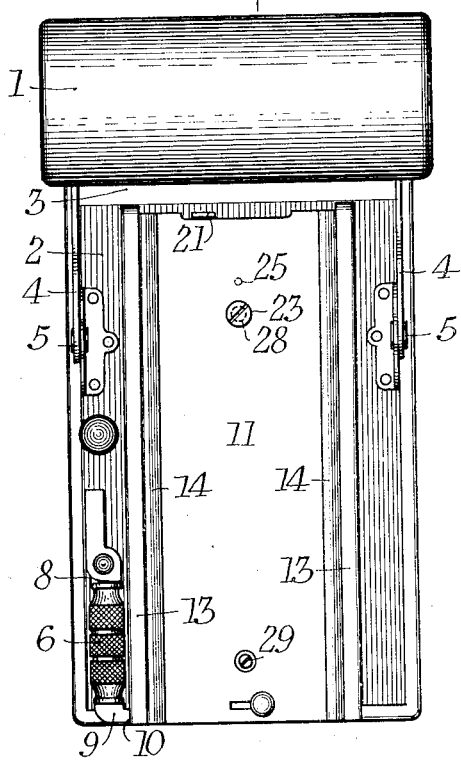
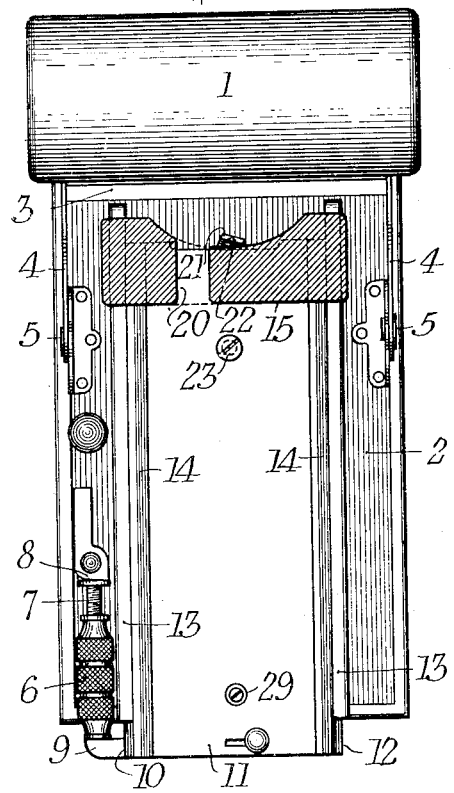
Carl C. Fuerst,
INVENTOR,
BY
ATTORNEYS.

Patented Mar. 11, 1930

1,750,222

UNITED STATES PATENT OFFICE

CARL C. FUERST, OF ROCHESTER, NEW YORK, ASSIGNOR TO EASTMAN KODAK COMPANY, OF ROCHESTER, NEW YORK, A CORPORATION OF NEW YORK

CAMERA-LENS CARRIAGE AND TRACK LATCH

Application filed June 29, 1928. Serial No. 289,106.

This invention relates to photography and more particularly to photographic cameras which may be folded up into a compact space. One object of my invention is to provide a latch member which will limit the movement of the camera track relative to the camera bed. Another object of my invention is to provide such a latch which will also prevent the lens carriage from being prematurely moved into the camera body. Another object of my invention is to provide a latching member which is flat and takes up very little space and which may be readily assembled and disassembled in manufacturing. Another object is to provide a latch having a pin and slot connection adapted to move the latch very quickly at one end of its movement and to retain the latch in an operative position throughout the major portion of the movement of the track relative to the camera bed. Another object of my invention is to provide a camera latch adapted to both limit the lens carriage movement and to limit the movement of the camera track, and other objects will appear from the following specification, the novel features being particularly pointed out in the claims at the end thereof.

Coming now to the drawings wherein like reference characters denote like parts throughout,—

Fig. 1 is a top plan view of a camera having a lens carriage and track latch construction in accordance with and embodying a preferred form of my invention;

Fig. 2 is a view similar to Fig. 1, with the parts in a different position, the lens carriage being shown in section taken along the line 2—2 of Fig. 3;

Fig. 3 is a partial front elevation of the camera shown in the first two figures;

Fig. 4 is an enlarged detail view of the latching member removed from the camera but shown in proper relation to its operating pin and pivot; and Fig. 5 is a view similar to Fig. 4, but with the latch in an operative position.

In folding cameras, focusing may be accomplished by moving the camera track relative to the camera bed. When the camera track has been extended, unless some means be provided to prevent it, the lens carriage may be moved rearwardly towards the camera body and moved from the end of the track. My present invention is directed to overcoming this difficulty.

As shown in the drawings, the camera may comprise a body portion 1 to which a camera bed 2 may be hinged at 3, there being side braces 4 pivotally attached at 5 to the bed to support it when the camera is open. The camera bed may be provided with any desired type of focusing mechanism, here shown as a nut 6 movable upon a fixed screw 7 carried by a bracket 8 and attached to a bracket 9, which has one end 10 affixed to a movable track 11.

The track is here shown as a flat plate having flanges 12 engaging the rails 13 which are affixed to the camera bed 2. The plate 11 also supports rails 14 which are engaged by the lens carriage 15.

As shown in Fig. 3, this lens carriage may consist of the usual clamping mechanism 16, lens board 17, shutter 18 and objective 19. Since it forms no part of this invention, the mechanism by which the lens carriage is latched to the camera track will not be described.

It should be noted, however, that the lens carriage 15 is provided with an opening in the form of a slot 20, this opening being of somewhat greater width than an upstanding lug 21 carried by a latching member 22, which operates between the camera track and the bed.

The latch 22 has a pin and slot and pivoted connection with the two members which it connects,—that is, with the track and with the camera bed. In the present instance I prefer to pivot the latch on a stud 23 carried by the camera track and to provide a cam slot 24 in which a pin 25, carried by the camera bed, may slide when the camera track is moved by the focusing nut 6.

From Fig. 5 it should be noted that the cam slot 24 throughout the greater part of its length is straight and that there is a curve 26 at one end. Fig. 4 illustrates the position of the parts when the camera bed 11 is completely retracted in position for the camera to be folded up. In this position the latch is inoperative with respect to the lens carriage, because it lies in the path of the groove 20 in the base of the carriage, so that the lens carriage may slide freely over the latch. The dotted and dashed lines 20A illustrate the path of the notch 20 as the lens carriage is moved on the track.

When, however, the focusing nut 6 is turned, the lug 21 will be cammed quickly from the path 20A, as indicated in Fig. 5, and continued movement of the sliding member 11 will merely cause the pin 25 to ride through the straight portion 27 of the slot and the lug 20 will remain substantially in the position shown in Fig. 5. In this position it is out of alignment with the slot 20 and will thus prevent the lens carriage from being moved off the track. This is indicated in Fig. 2.

Since the nut 6 in focusing the camera is turned upon a screw 7, which is affixed to the bracket 8, some means must be provided for limiting the track relative to the bed to prevent the nut from being screwed off the end of the threaded member 7. By providing the slot 24 of the proper length the movement of the track 11 may be limited so that the nut 6 will always engage the screw 7. Thus the latch 22 serves to both hold the movement of the track 11 within definite limits with respect to the camera bed 2 and to allow the lens carriage to be moved from the track into the camera body only when the track is in a fully retracted position.

It should be noticed that the latch member 22 can be very readily assembled and disassembled, because it is held in place by a single stud 23. In assembling a camera constructed in accordance with this invention, it is only necessary to lay the latch member over the pin 25 which is carried by the camera bed 2 and to slide the track 11 on until the nut 6 engages the screw 7 and then turn this nut until the aperture 28, through which the stud 23 passes, is in the proper position. Then by screwing stud 28 into position, the parts are properly assembled.

The operation of my invention is as follows: With the parts in the position shown in Fig. 1, the lens carriage is drawn out against the stop 29 by means of the handle 16. The camera may be then focused by turning the nut 6. If, however, the nut is turned before the lens carriage is drawn out, the lug 21 will be rocked from the path 20A of the slot, so that the front part of the lens carriage will strike the lug and will prevent the lens carriage from being drawn out until the camera track has been properly adjusted.

If the lens carriage should be pushed towards the camera body before the bed is in place, as in Fig. 2, the lug 21 will strike the rear part of the carriage and prevent the carriage from being moved off the track until nut 6 has been turned to move the track to its innermost position.

Having thus described my invention, what I claim as new and desire to secure by Letters Patent is:

1. In a camera, the combination with a bed, of a track slidably mounted thereon, a lens carriage adapted to slide on the track, and means including a slotted link and a pin for connecting the camera bed and track adapted to limit the movement of the lens carriage in one direction.

2. In a camera, the combination with a bed, of a track slidably mounted thereon, a lens carriage adapted to slide on the track, and means movable between the camera bed and track, being pivotally attached to one and having a pin and slot connection with the other for limiting the movement of the track relative to the bed.

3. In a camera, the combination with a bed, of a track slidably mounted thereon, a lens carriage adapted to slide on the track, and means movable between the camera bed and track, being pivotally attached to one and having a pin and slot connection with the other for limiting the movement of the track relative to the bed, said means including an upturned lug adapted to be moved through the pin and slot connection to and from a position in which movement of the lens carriage relative to the track may be limited.

4. In a camera, the combination with a bed, of a track slidably mounted thereon, a camera carriage slidable on the track and having a slot therein, a connecting member for the camera bed and track pivoted to one and having a pin and slot connection with the other, and having a lug projecting upwardly, the shape of the slot being such that the lug may be in alignment with the lens carriage slot in only one position of the track.

5. In a camera, the combination with a bed, of a track slidably mounted thereon, a camera carriage slidable on the track, a latch member pivoted to the track, said latch having a cam surface, a pin on the bed engaging the cam surface, the latch being movable to and from an operative position in which it may engage the lens carriage by the cam when moved through its pivotal connection with the camera track.

6. In a camera, the combination with a bed, of a track movable thereon, means for limiting the movement of the track relative to the bed including a slotted link, a pin for entering the slot, and a stud for supporting the link being carried by the bed and track.

7. In a camera, the combination with a bed, of a track movably mounted thereon, a link hinged to the track and having a slotted portion, a pin on the bed engaging the slot, whereby the extent of movement of the bed may be controlled by the pin and slot.

Signed at Rochester, New York, this 18th day of June, 1928.

CARL C. FUERST.